United States Patent [19]

Guha

[11] 3,838,860

[45] Oct. 1, 1974

[54] TRIPPING MECHANISM FOR RECORD CHANGER

[75] Inventor: Dwipendra Nath Guha, Benton Harbor, Mich.

[73] Assignee: Avnet, Inc., New York, N.Y.

[22] Filed: July 2, 1971

[21] Appl. No.: 159,109

[52] U.S. Cl. .......... 274/10 R
[51] Int. Cl. .......... G11b 17/12
[58] Field of Search .......... 274/10 R

[56] References Cited

UNITED STATES PATENTS

| | | | |
|---|---|---|---|
| 3,476,393 | 11/1969 | Estkowski | 274/10 R |
| 2,539,409 | 1/1951 | Erbe | 274/1 L |
| 3,390,883 | 7/1968 | Van Antwerp | 274/10 R |
| 3,321,205 | 5/1967 | Dennis | 274/10 R |
| 2,803,465 | 8/1957 | Dobrogowski et al. | 274/1 L |

*Primary Examiner*—Louis R. Prince
*Assistant Examiner*—Steven L. Stephan
*Attorney, Agent, or Firm*—Johnson, Dienner, Emrich, Verbeck & Wagner

[57] ABSTRACT

A tripping system for initiating cycling of a tone arm set-down control mechanism in a record changer, wherein driving engagement between a cam gear on the set-down mechanism and a drive pinion on the hub of the turntable is initiated by a trip pawl carried by the cam gear and selectively engaged by a drive projection on the turntable hub. The cam gear, hub projection, and trip pawl cooperate in a manner to prevent accidental continuous tripping of the pawl after a single revolution cycle of the cam gear.

10 Claims, 5 Drawing Figures

Inventor:
Dwipendra Nath Guha

By: Johnson, Dienner, Emrich, Verbeck & Wagner Attys.

Inventor
Dwipendra Nath Guha
By Johnson, Dienner, Emrich, Verbeck & Wagner Attys.

TRIPPING MECHANISM FOR RECORD CHANGER

BACKGROUND OF THE INVENTION

The present invention relates generally to record changers, and more particularly to a novel tripping system for initiating cycling of a tone arm set-down control mechanism.

It is known in the art of record changers to employ a tone arm set-down control mechanism which is automatically actuated to raise a tone arm from a record disposed on a turntable upon completion of play, move the tone arm to a position offset from the turntable to allow lowering of a new record to the turntable for playing, return the tone arm to a position overlying the lead-in groove of the newly lowered record, and thereafter lower the tone arm to the record for playing. An example of such a tone arm set-down control mechanism is disclosed in U.S. Pat. No. 3,476,393 to M. H. Estkowski, and assigned to the assignee of the present invention. As therein disclosed, the tone arm set-down control mechanism includes a mutilated cam gear which is selectively engageable with a pinion gear formed on the hub of a turntable, the mutilated cam gear having a notch in its peripheral gear teeth which serves to effect non-engagement between the hub pinion gear and the cam gear of the set-down control mechanism when the notch is adjacent the hub gear. The cam gear of the control mechanism carries pawl means which is selectively engageable with a drive projection on the turntable hub to initiate driving engagement between the hub pinion gear and the driven cam gear. The set-down control mechanism further includes means for effecting engagement between the trip pawl and the hub drive projection when the tone arm has reached a predetermined inward position on the record being played so as to initiate a rotational cycle of the cam gear and thereby effect cycling of the set-down control mechanism for moving the tone arm through a record change cycle.

A tone arm set-down control mechanism of the type aforedescribed, while being functionally adequate, has the disadvantage that the trip pawl may be accidently and unintentionally engaged by the hub drive projection with resulting continuous cycling of the control mechanism. For example, a sudden jolt against the record changer after a record change cycle can result in actuation of the trip pawl and thereby effect continuous recycling of the tone arm set-down control mechanism. Attempts have been made to prevent such unintentional tripping of the trip pawl and continuous recycling of the set-down control mechanism after the tone arm has been lowered to a new record for playing. One attempt at preventing unintended tripping of the trip pawl has been to increase the frictional resistance to pivotal movement of the trip pawl. This method, however, has not been completely satisfactory in that it increases side loading on the tone arm by resisting free movement thereof and consequently is detrimental to quality sound reproduction. The present invention overcomes the problem of accidental continuous cycling of tone arm set-down control mechanisms in record changers by providing a construction wherein continuous tripping of the trip pawl is prevented.

SUMMARY OF THE INVENTION

One of the primary objects of the present invention is to provide a novel tripping system for use with a tone arm set-down control mechanism wherein means are provided to prevent continuous recycling of the set-down control mechanism after completion of a record change cycle.

Another object of the present invention is to provide a novel tripping system for a tone arm set-down control mechanism wherein the tripping system includes a cam gear selectively engageable with a pinion gear on a turntable hub, and a trip pawl carried by the cam gear for tripping engagement with a hub drive projection, the cam gear, trip pawl and hub drive projection cooperating in a manner to prevent continuous tripping of the trip pawl after each change cycle of the cam gear.

A feature of the present invention is to provide in a tone arm set-down control mechanism the combination of a cam gear, turntable hub drive projection, and trip pawl carried by the cam gear, wherein the number of teeth on the cam gear and the circumferential width of the hub drive projection are established to effect a wiping engagement of the trip pawl against the outer surface of the hub drive projection should the trip pawl be accidently moved against the turntable hub after completion of a change cycle of the cam gear whereby to prevent continuous tripping of the trip pawl.

In carrying out the objects and advantages of my invention, I provide a tripping system for use with a tone arm set-down control mechanism which includes a cam gear selectively engageable with a pinion gear on a turntable hub to actuate the control mechanism and effect movement of the tone arm during a record change cycle. The tripping system includes a trip pawl carried by the cam gear for selective engagement with a drive projection on the turntable hub to initiate driving engagement between the cam and hub pinion gears. The cam gear includes a notch which, when disposed opposite the hub pinion, establishes non-engagement between the hub pinion and cam gear. The cam gear is provided with one additional gear tooth over the number corresponding to the exact pinion gear to cam gear speed ratio so that the relative positions of the pinion and cam gears change by one circular pitch after the pinion gear is rotated during a record change cycle. The hub drive projection has a circumferential width equal to greater than the circular pitch of the hub gear so that after the cam is rotated through one revolution during a record change cycle, the trip pawl will engage the outer wiping surface of the hub projection should the trip pawl be accidentally jolted to engage the turntable hub. After the hub drive projection has wiped past the trip pawl, the trip pawl may be moved into tripping engagement with the hub drive projection whereby to effect a change of cycle of the tone arm set-down control mechanism. In this manner, a sudden jerk or force exerted on the record changer near the end of the cycle will not cause continuous tripping and recycling of the tone arm set-down mechanism. A trip plate is connected to the tone arm for rotational movement with the tone arm and is adapted to engage a clutch plate carried by the cam gear to move the trip pawl into tripping engagement with the turntable hub drive projection when the tone arm has completed playing a record disposed on the turntable.

Further objects and advantages of the present invention, together with the organization and manner of operation thereof, will become apparent from the following detailed description of one embodiment of the invention when taken in conjunction with the accompanying drawings wherein like reference numerals designate like parts throughout the several views.

DESCRIPTION OF A PREFERRED EMBODIMENT

Figure 1:
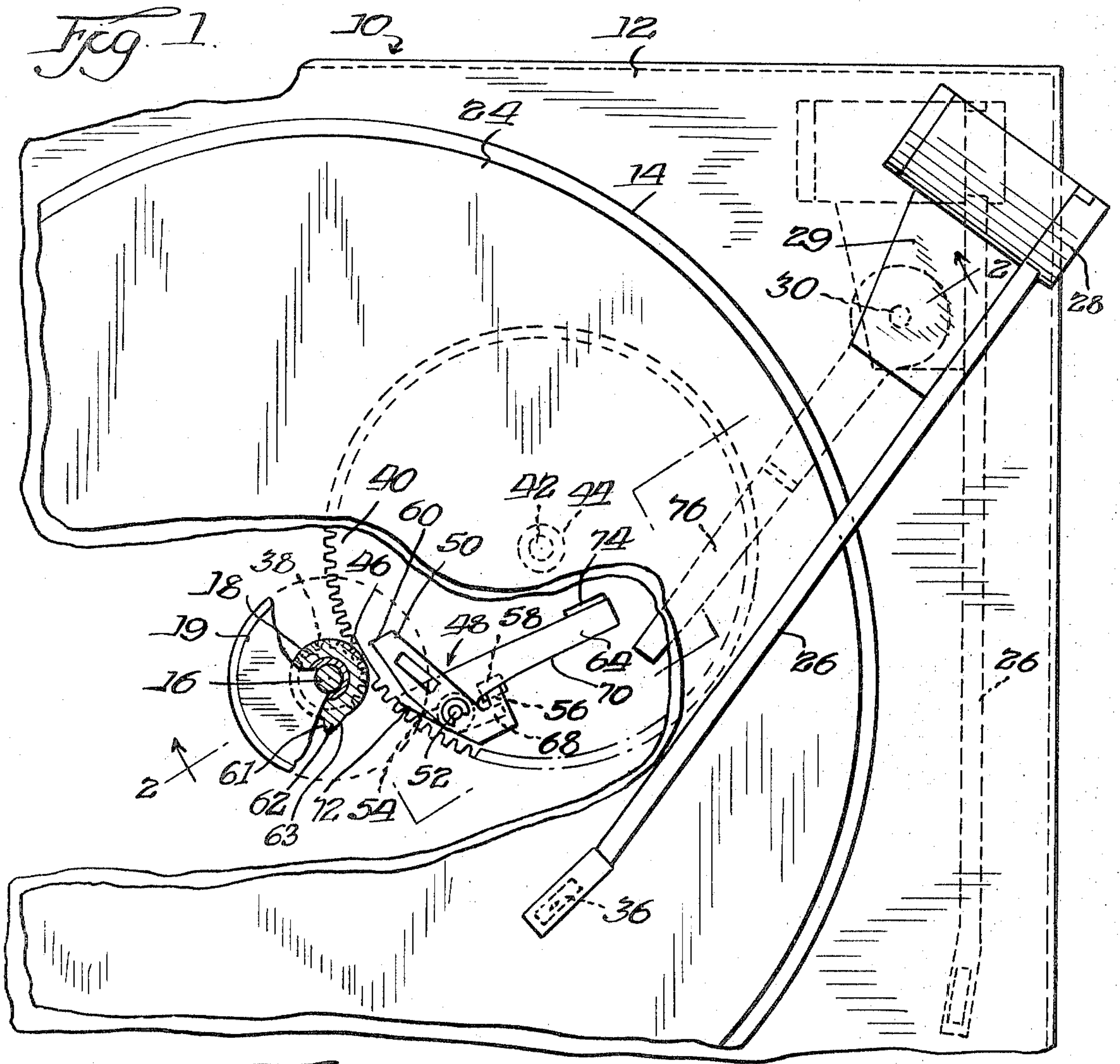
FIG. 1 is a partial plan view of a record changer incorporating the present invention, portions of the turntable and base plate being broken away to better illustrate the invention.
Figure 2:
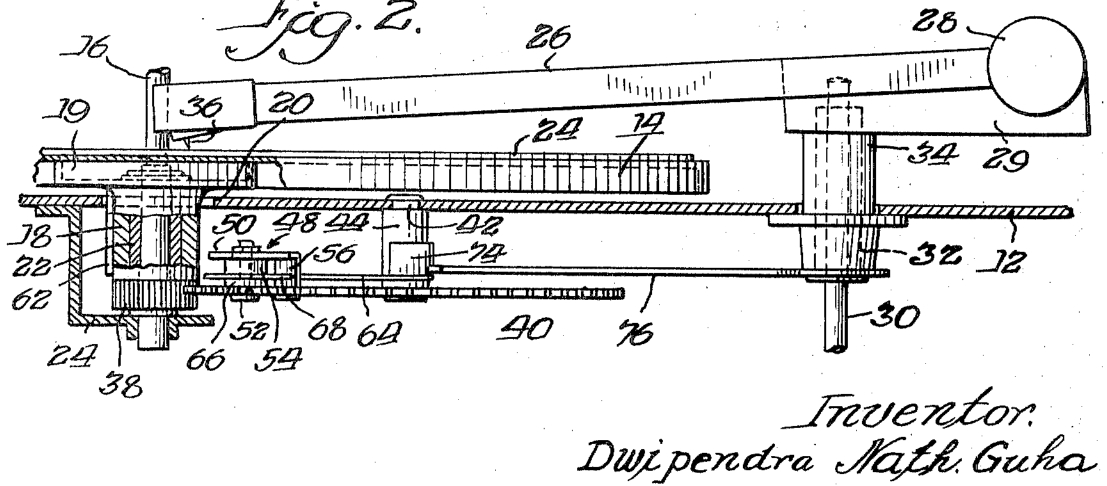
FIG. 2 is a vertical sectional view taken substantially along the line 2—2 of FIG. 1 but showing the tone arm moved to a playing position on a record supported on the turntable.

Referring now to the drawings, and in particular to FIGS. 1 and 2, the present invention has been illustrated, by way of example, in a record changer a portion of which is indicated generally at 10. The record changer 10 is illustrated as having a base plate 12 of generally square or rectangular plan configuration and which supports a circular turntable 14 for rotational movement about a vertical center spindle 16 in a known manner. The turntable 14 is supported above the base plate 12 and includes an axially disposed cylindrical hub portion 18 which is secured to the undersurface of the turntable through an increased diameter flange 19 and depends downwardly through a suitable opening 20 in the base plate 12. The hub 18 is rotatably supported on the center spindle 16 through a sleeve bearing 22, the lower end of the spindle 16 being supported by a depending bracket 24 secured to the lower surface of the base plate 12. The center spindle 16 may comprise a conventional record centering spindle over which a record such as 24 may be manually placed for playing, or the center spindle may comprise a spindle adapted to support a plurality of records above the turntable and sequentially lower the records to the turntable for playing as is known. Conventional turntable drive means (not shown) are supported below the base plate 12 for effecting selective rotation of the turntable during operation of the record changer.

The base plate 12 further supports a tone arm 26 for pivotal movement in a vertical plane about a horizontal pivot axis 28 established between the tone arm and its pivotal connection to a support bracket 29. The tone arm 26 and bracket 29 are adapted for pivotal or rotational movement about a vertical axis defined by a tone arm lift pin 30. The lift pin 30 is vertically slidable in a tone arm support sleeve 32 which is supported for rotational movement about its axis by a housing 34 suitably secured to the horizontal base plate 12. The upper end of the support sleeve 32 is secured to the tone arm bracket 29 such that rotation of the support sleeve 32 effects a corresponding horizontal rotational movement of the tone arm 26. The tone arm 26 has a stylus 36 supported at its innermost end for engagement with the record 24 when the tone arm is moved to a record playing position, the stylus 36 being received within the outermost lead-in groove of the record and following the groove to an innermost run-out groove of the record as is known.

The particular tone arm construction, as well as the manner of effecting driving rotation of the turntable 14, form no part of the present invention and will not be described in greater detail herein, it being understood that the present invention may find application in many types of record changers.

The present invention is directed primarily to tripping system means for effecting actuation of a tone arm set-down control mechanism which is operative to move the tone arm 26 from a raised position offset from the turntable 14, as shown in phantom in FIG. 1, to a position wherein the stylus 36 is positioned over the lead-in groove of a record 24 positioned on the turntable, then lower the tone arm to a record playing position, and thereafter raise the tone arm after completion of record play and move the tone arm to its initial position offset from the turntable. The particular tone arm set-down control mechanism may be of known construction such as disclosed in the above-referenced U.S. Pat. No. 3,476,393 to M. H. Estkowski. Only portions of the tone arm set-down control mechanism which are necessary for a clear understanding of the present invention will be described in detail herein, the remaining elements of the referenced Estkowski patent structure which are incidental to the present invention being incorporated herein by reference.

For purposes of describing the present invention, it will be understood that the tone arm set-down control mechanism is adapted to effect longitudinal movement of the pivot pin 30 for raising and lowering the tone arm 26, and includes means for effecting rotational movement of the tone arm support sleeve 32 for moving the tone arm between its innermost position, as at the end of record play, to its rest position offset from the turntable. Tone arm set-down control mechanisms such as that disclosed in the referenced Estkowski patent receive their primary motion power from the drive hub 18 of the turntable 14. To this end, the hub 18 has pinion spur gear teeth 38 disposed peripherally thereabout adjacent the lower end thereof. The turntable gear teeth 38 are adapted for selective driving engagement with a circular cam gear member 40 which, for example, corresponds to the gear 19 described in the above referenced Estkowski U.S. Pat, No. 3,476,393. The cam gear 40 is rotatably mounted beneath the base plate 12 by a support pin 42 and spacer sleeve 44, the support pin 42 being suitably swaged or otherwise secured to the base plate and supporting the cam gear in a horizontal plane for rotational movement about the axis thereof. While the cam gear 40 is described as being supported directly by the base plate 12, it will be understood that it may be suitably supported by portions of the tone arm set down control mechanism not herein illustrated and described, it being only necessary that the cam gear be located generally in a position as illustrated and described herein. The cam gear 40 has a notch 46 provided in the peripheral edge portion thereof such that when the notch is disposed in a position opposite the spur gear 38, the cam gear is out of mesh or engagement with the pinion gear 38.

In accordance with known tone arm set-down control mechanisms, such as that disclosed in the referenced Estkowski patent, the control mechanism completes a cycle of operation wherein the tone arm is raised after record playing, moved to a position offset from the turntable to allow lowering of a new record to the turntable, and thereafter moved inwardly and lowered to the new record for playing during one revolution of the cam gear 40. The cam gear 40 carries trip means, indicated generally at 48, operative to effect selective driving engagement between the pinion gear 38 on the turntable hub 18 and the cam gear 40 for moving the cam gear through one revolution during cycling of the tone arm set-down control mechanism.

Figures 3, 4:
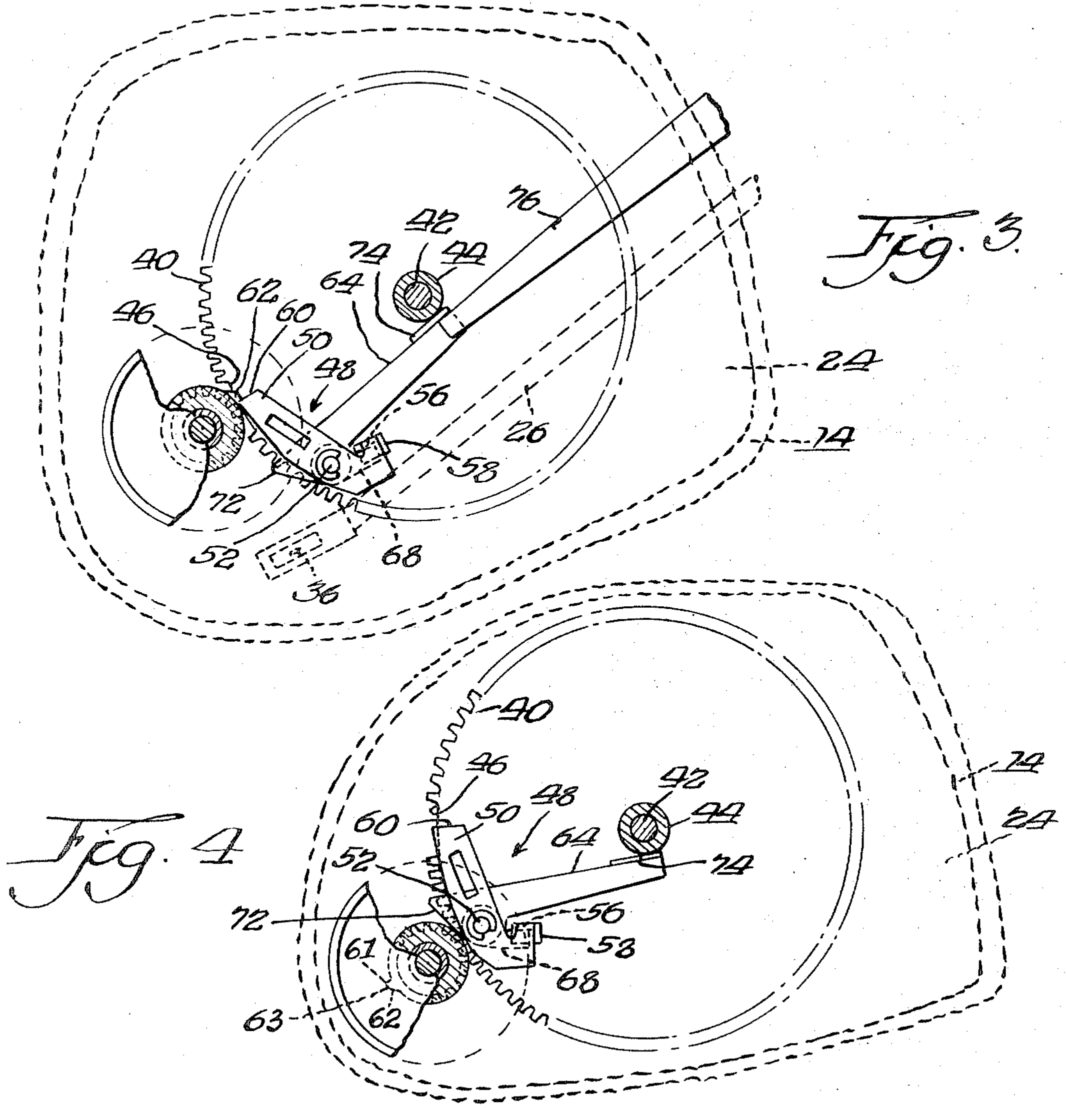
FIGS. 3–5 are partial horizontal sectional views illustrating the cam gear and trip pawl in various operating positions relative to the turntable hub pinion and trip projection during operation of the record changer.

The trip means 48 includes a trip pawl 50 which is pivotally mounted on a pivot pin 52 suitably secured in upstanding relation on the cam gear 40. The trip pawl 50 is supported on the pivot pin 52 in a horizontal plane above the plane of the cam gear 40 through a spacer sleeve 54 and has a downwardly depending leg portion 56 which projects downwardly through a rectangular opening 58 in the cam gear. The rectangular opening 58 is of a size sufficient to allow limited pivotal movement of the trip pawl 50 between an inward position wherein an end trip surface 60 on the trip pawl is positioned radially inwardly from the peripheral gear teeth on the cam bear 40, as shown in FIG. 1, and an outward pivotal position wherein the trip surface 60 extends radially outwardly of the outer envelope of the peripheral teeth of the cam gear for engagement with the leading edge 61 of a longitudinally extending drive projection 62 on the turntable drive hub 18, as shown in FIG. 3.

The trip means 48 further includes a trip clutch plate 64 which is pivotally supported on the pivot pin 52 above the plane of the cam gear 40 between the spacer sleeve 54 and a second lower spacer sleeve 66 disposed about the pivot pin. The trip clutch plate 64 has a finger portion 68 which defines with a portion of an edge surface 70 of the trip clutch plate a U-shaped opening through which the leg portion 56 of the trip pawl 50 depends. As will become more apparent hereinbelow, the finger portion 68 and edge surface 70 adjacent finger 68 serve to selectively engage opposite vertical surfaces of the depending leg portion 56 of the trip pawl during pivotal movement of the trip clutch plate 64 and effect a corresponding pivotal movement of the trip pawl. The trip clutch plate 64 includes a camming surface 72 which is adapted to be engaged by the annular peripheral surface of the turntable hub 18 just above the spur teeth 38 for moving the trip clutch plate in a clockwise direction about pivot pin 52 during one revolution of the cam gear 40 as will be described more fully below. The trip clutch plate 64 has an upstanding arm portion 74 formed integral therewith and adapted for engagement with the inward end of a tone arm trip plate 76 secured to the tone arm support sleeve 32 for simultaneous movement with the tone arm 26 during operation of the record changer.

As noted above, in tone arm set-down control mechanisms such as that disclosed in the referenced Estkowski U.S. Pat. No. 3,476,393 the cam gear is driven through a single revolution during a tone arm change cycle. During normal playing of a record, the trip clutch plate 64 and trip pawl 50 are disposed in positions as illustrated in FIG. 1 with the edge surface 70 of the trip clutch plate urging the trip pawl to its inward position on the cam gear through engagement with the depending leg portion 56 of the trip pawl. During such normal record playing the turntable hub 18 rotates with the turntable hub drive projection 62 bypassing the trip pawl 50. As the tone arm 26 reaches its innermost position on a record with its stylus disposed in the run-out groove of the record, the tone arm trip plate 76, which has rotated with the tone arm, engages the upstanding arm 74 on the trip clutch plate 64 and pivots the trip plate clutch in a counterclockwise direction about the pivot pin 52, as considered in FIG. 3. Such counterclockwise rotational movement of the trip clutch plate effects engagement of the finger portion 68 thereof with the depending leg portion 56 of the trip pawl 50 to pivot the trip pawl in a counterclockwise direction and into sliding engagement with the annular peripheral surface of the turntable hub 18. With the trip pawl engaging the rotating turntable hub, the leading edge 61 of the drive projection 62 thereon will engage the end trip surface 60 of the trip pawl 50 and effect counterclockwise rotational movement of the cam gear 40, as considered in FIG. 3. The end trip surface 60 of the trip pawl is spaced from the axis of pivot pin 52 so that engagement of the trip surface with the hub drive projection 62 will rotate the cam gear 40 counterclockwise sufficiently to cause engagement of the spur teeth 38 on the turntable hub with the peripheral teeth on the cam gear. Thereafter, continued rotation of the turntable establishes positive driving rotation of the cam gear.

Figure 5:
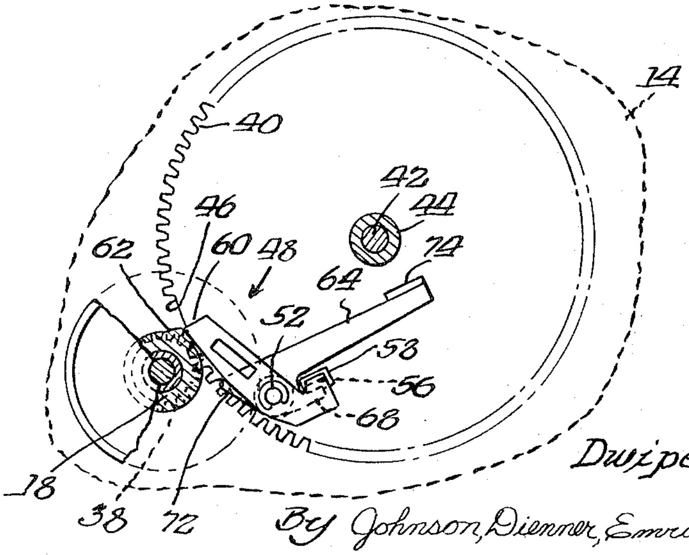

As the cam gear 40 is rotated through one revolution, the tone arm set-down control mechanism raises the tone arm from the record and moves it to a position outwardly of the turntable 14 as shown in phantom in FIG. 1. Such outward movement of the tone arm 26 effects a corresponding outward movement of the tone arm trip plate 76 whereby to disengage the upstanding arm portion 74 of the trip clutch plate 64. With the tone arm trip plate 76 removed from engagement with the trip clutch plate 64, the trip clutch plate is freely rotatable to its initial position as illustrated in FIG. 1. Such return movement of the trip clutch plate 64 is effected during a revolution of the cam gear 40 through engagement of the camming surface 72 on the trip clutch plate with the annular peripheral surface of the turntable hub 18 as illustrated in FIG. 4. Engagement of the camming surface 72 with the annular peripheral surface of the turntable hub effects clockwise rotation of the trip clutch plate which engages the depending leg portion 56 of the trip pawl and effects a clockwise pivotal movement of the trip pawl to a position substantially as shown in FIG. 5.

In the particular turntable hub pinion gear 38 and cam gear 40 arrangement illustrated, a theoretical speed ratio of 6:1 is established between the turntable hub and the cam gear. This would dictate that the cam gear 40 have six times the number of teeth provided on the turntable hub pinion 38. In accordance with the present invention the cam gear 40 is provided with a number of teeth which, if disposed about the complete periphery of the cam gear, would be equal to one plus (the multiple of the speed ratio) times y(the number of spur teeth 38) and the pitch of the cam geaar teeth would be $1/1+xy$ C, C being the cam gear circumference. For example, if the pinion gear 38 has 22 teeth thereon, the cam gear 40 would be provided with 133 teeth about its peripheral surface, considered prior to establishing the notch 46 which involves eliminating four teeth from the cam gear and the pitch of the cam gear teeth would be 1/133 C.

In the prior art devices, the cam gears were provided with a number of teeth equal to the multiple of the desired speed ratio times the number of teeth on the turntable hub pinion gear so that the hub pinion and cam gears returned to their exact same starting position after one revolution of the cam gear. In the prior art devices, a sudden movement or jolt against the record changer after one revolution of the cam gear would effect tripping movement of the trip pawl against the turntable hub drive projection and continue rotational movement of the cam gear whereby to recycle the tone arm set-down mechanism. By providing the extra tooth on the cam gear 40 over the exact multiple of the speed ratio times the number of pinion teeth 38, I change the position of the cam gear relative to the turntable pinion 38 an arcuate distance equal to one circular pitch of the cam gear as the turntable is rotated six times during a record change cycle, considered in the above noted example. To prevent accidantial continuous tripping of the trip pawl 50 by the hub projection 62, I establish the arcuate width of the outermost peripheral surface 63 of the drive projection 62 such that its magnitude is greater than one circular pitch of the pinion teeth 38. This outermost peripheral surface 63 of the drive projection 62 I identify as its "arcuate wiping surface." By so increasing the number of teeth on the cam gear 40 by one, and establishing an arcuate wiping surface width on the hub drive projection 62 of greater than one circular pitch of the hub pinion gear, I insure that sudden movement of the trip pawl 50 against the turntable drive hub 18 after one cycle of the cam gear resulting from driving engagement between the cam gear and drive hub pinion 38 will cause the trip pawl to engage the outer wiping surface of the drive projection and effect bypassing of the hub drive projection without engaging the end trip surface 60 of the trip pawl. The latter wiping action can best be seen in FIG. 5. In this manner, the tone arm 26, having been lowered to a record on the turntable for playing during a single revolution of the cam gear 40, will not be interrupted and accidently raised as would result from continuous tripping of the cam gear 40 as is possible in the prior art devices. Upon completion of playing a record, with the tone arm 26 moved inwardly to the runout groove of the record, the tone arm trip plate 76 will again engage the upstanding arm 74 on the trip clutch plate 64 to move the trip pawl 50 inwardly against the turntable drive hub whereupon the trip surface 60 thereon will be engaged by the drive projection 62 on the turntable hub for effecting a change cycle revolution of the cam gear 40 as described.

Thus, in accordance with the above described embodiment of my present invention, I have provided a tripping system for a record changer tone arm set-down control mechanism which prevents continuous tripping of the cam gear with resulting unintended recycling of the tone arm set-down control mechanism. I have prevented such continuous tripping without increasing the frictional resistance to pivotal movement of the trip pawl and have thereby eliminated additional undesirable side loads on the tone arm which result in poor quality sound reproduction.

While I have described a preferred embodiment of my invention, it will be understood to those skilled in the art that changes and modifications may be made therein without departing from the invention in its broader aspects.

I claim:

1. Actuating means for the tone arm set-down control mechanism of a record player comprising a drive gear to rotate with the turntable of a record player, a drive projection rotatable with the drive gear and a rotatable cam gear to be operatively connected to the tone arm set-down control mechanism of the record player, the teeth of the drive gear meshing with the teeth of the cam gear to effect a rotational cycle of the cam gear, the cam gear having a notch in its peripheral edge such that the peripheral extent of its teeth is less than the full periphery of the cam gear to establish non-engagement between the drive and cam gears when the notch is disposed opposite the drive gear, and trip means carried by the cam gear and selectively movable into the path of the leading edge of the drive projection such that rotation of the drive projection moves the cam gear far enough to relocate the notch and initiate driving engagement between the teeth of the drive and cam gears to effect said rotational cycle of the cam gear, the improvement wherein the pitch of the cam gear teeth is $1/1+1+xy$ C, C being the circumference of the cam gear, $x$ being the number of drive gear teeth and $y$ is an integer just slightly less than the exact multiple of the speed ratio between the drive and cam gears, and the end surface of the drive projection having a circumferential width greater than the pitch of the drive gear teeth such that the drive gear rotates the cam gear to a position at the end of a driven rotational cycle of the cam gear such that the end surface of the drive projection is located to wipe back and prevent engagement of the trip means by the leading edge of the projection.

2. In a record changer having a rotatable turntable, a tone arm movable through a record playing cycle when positioned in the starting groove of a record on the turntable, a tone arm set-down control mechanism operable to raise and move the tone arm off a record on the turntable at the end of a record playing cycle to a position offset from the turntable and then to return and lower the tone arm to a playing position in the starting groove of a record on the turntable, and actuating means for the tone arm set-down control mechanism including a drive gear rotatable with the turntable, a driven projection rotatable with the drive gear, a rotatable cam gear so positioned that its peripheral teeth engage the peripheral teeth of the drive gear so as to be rotated therewith, the cam gear having a notch in the peripheral edge thereof such that the drive gear is out of driving engagement with the cam gear when the notch is disposed opposite the drive gear, pawl means mounted on the cam gear for movement into and out of an engageable position at the cam gear periphery where it is engageable by the leading edge of the drive projection, and a trip member operable by the tone arm at the end of a record playing cycle t0 move the pawl means into said position for engagement by the leading edge of the drive projection such that the drive projection will rotate the cam gear far enough to cause engagement of the driving gear teeth with the cam gear teeth and effect a rotational cycle of the cam gear to operate the tone arm set-down control mechanism, the improvement wherein the pitch of the teeth on the cam gear is $1/N+xy$ C, considering C as the circumference of the cam gear, $x$ the number of teeth on the drive gear, $y$ is an integer just slightly less than the multiple of the speed ratio between the drive and cam gears and N is a small integer, and the outer end of the drive projection has an arcuate width greater than N times the pitch of the drive gear teeth such that at the end of each rotational cycle of the cam gear the outer end of the drive projection is so located as to wipe back the pawl means should said pawl means be accidentally moved toward its said engageable position to prevent continuous tripping engagement of the pawl means by the drive projection and thereby recycling of the cam gear and operation of the tone arm set-down control mechanism.

3. The improvement of claim 2 wherein N is one.

4. The improvement of claim 3 wherein the notch in the peripheral edge of the cam gear has a circumferential width equivalent to the circumferential width of four cam gear teeth.

5. The improvement of claim 2 wherein $y$ has a value of 6.

6. The improvement of claim 5 wherein the drive projection rotates on the axis of the drive gear.

7. The improvement of claim 2 wherein the drive gear and cam gear has a predetermined angular velocity ratio such that rotation of the turntable through a predetermined whole number of revolutions will effect an operating cycle of the cam gear when engaged with the drive gear, the cam gear having a number of gear teeth effective to rotate the cam gear through one complete revolution less an arcuate distance equal to one circular pitch of the cam gear as the drive gear is rotated through said predetermined whole number of revolutions.

8. The improvement of claim 7 wherein said pawl means includes a trip pawl pivotally supported by the cam gear, said trip pawl having a drive projection engaging surface thereon disposed adjacent the notch in the cam gear, and including means movable with the tone arm and engageable with the trip pawl means to move the trip pawl into tripping engagement with the drive projection when the tone arm completes playing of a record disposed on the turntable.

9. The improvement of claim 8 wherein said pawl means includes a trip clutch plate pivotally supported by the cam gear, said trip clutch plate being engageable with said trip pawl and adapted to move said trip pawl to a position for nonengagement with the drive projection during a drive cycle of the cam gear.

10. The improvement of claim 9 wherein the turntable includes an axially disposed generally cylindrical hub portion, said drive gear being formed on the hub portion and said drive projection extending longitudinally of the hub portion, and wherein said trip clutch plate includes a cam surface adapted to engage the hub portion during a driven cycle of the cam gear and move said trip plate to said position for nonengagement with said drive projection.

* * * * *